(12) United States Patent  
Wenstrup et al.

(10) Patent No.: US 8,137,957 B2
(45) Date of Patent: Mar. 20, 2012

(54) NON-WOVEN COVER FOR CONTAINING AND ABATING ODIFEROUS ORGANIC EMANATIONS

(75) Inventors: David E. Wenstrup, Greer, SC (US); Venkatkrishna Raghavendran, Greer, SC (US)

(73) Assignee: Milliken & Company, Spartanburg, SC (US)

( * ) Notice: Subject to any disclaimer, the term of this patent is extended or adjusted under 35 U.S.C. 154(b) by 588 days.

(21) Appl. No.: 12/288,636

(22) Filed: Oct. 22, 2008

(65) Prior Publication Data

US 2010/0099180 A1   Apr. 22, 2010

(51) Int. Cl.
*C05F 9/02* (2006.01)
*B01J 35/06* (2006.01)

(52) U.S. Cl. ............. 435/290.1; 435/300.1; 435/266; 422/120; 422/122; 502/4

(58) Field of Classification Search ............. 210/167.13; 220/87.1, 913; 422/267, 120, 122; 435/291.1–291.4, 290.1, 300.1, 266; 442/394, 442/399; 502/4
See application file for complete search history.

(56) References Cited

U.S. PATENT DOCUMENTS

| | | | |
|---|---|---|---|
| 5,056,960 A | 10/1991 | Marienfeld | 402/270 |
| 5,208,098 A | 5/1993 | Stover | 428/284 |
| 5,401,552 A | 3/1995 | Bohrer et al. | 428/87 |
| 5,872,072 A | 2/1999 | Mouri et al. | 502/208 |
| 6,524,847 B2 | 2/2003 | Bisbis | 435/290.1 |
| 6,592,858 B1 | 7/2003 | Honda et al. | 424/76.1 |
| 6,659,688 B2 | 12/2003 | Baumgartner et al. | 405/129.9 |
| 6,851,891 B2 | 2/2005 | Baumgartner et al. | 405/129.9 |
| 6,866,912 B2 | 3/2005 | Higgins et al. | 428/95 |
| 6,998,081 B2 | 2/2006 | Morin et al. | 264/147 |
| 2002/0019045 A1* | 2/2002 | Bisbis | 435/290.1 |
| 2003/0134118 A1 | 7/2003 | Morin et al. | 428/375 |
| 2003/0175475 A1 | 9/2003 | Higgins et al. | 428/95 |
| 2005/0019589 A1* | 1/2005 | Wiedemann et al. | 428/450 |
| 2005/0209360 A1* | 9/2005 | Graichen et al. | 522/178 |
| 2005/0250401 A1 | 11/2005 | Baba | 442/59 |
| 2006/0139562 A1* | 6/2006 | Lee et al. | 349/190 |
| 2008/0011034 A1 | 1/2008 | Hochrein et al. | 71/9 |
| 2008/0032392 A1 | 2/2008 | Bauer et al. | 435/290.1 |

(Continued)

FOREIGN PATENT DOCUMENTS

DE        4231414        9/1992

(Continued)

OTHER PUBLICATIONS

"Explaining the Enhanced Photocatalytic Activity of Degussa P25 Mized-Phase TiO2 Using EPR" by Hurum et al.; *J. Phys. Chem. B.*, 2003, 107, 4545-4549.

(Continued)

*Primary Examiner* — William H Beisner
(74) *Attorney, Agent, or Firm* — Cheryl J. Brickey

(57) ABSTRACT

An odiferous organic compounds cover having an inner surface and an outer surface. The cover contains a thermoplastic non-woven layer containing thermoplastic fibers having a contact angle with water greater than about 70°. The cover contains a UV barrier layer contains containing a UV blocking polymer, having a thickness of between one to three times the diameter of the thermoplastic fibers of the non-woven layer, and containing discontinuities forming microchannels through the layer thickness. The cover also contains an odor mitigation layer containing a UV translucent polymer which transmits at least about 60% of UV(C) energy and anatase titanium dioxide. The odor mitigation layer comprises discontinuities forming microchannels through the layer thickness forms the outer surface of the cover.

20 Claims, 2 Drawing Sheets

U.S. PATENT DOCUMENTS

| | | | |
|---|---|---|---|
| 2008/0032393 A1 | 2/2008 | Bauer et al. | 435/290.1 |
| 2008/0038065 A1 | 2/2008 | Bauer et al. | 405/129.75 |

FOREIGN PATENT DOCUMENTS

| | | |
|---|---|---|
| DE | 298 16 749 | 2/1999 |

OTHER PUBLICATIONS

PCT Cooperation Treaty PCT International Search Report. Date of Mailing, Dec. 3, 2009. International Application No. PCT/US2009/004564. International Filing date, Aug. 8, 2009.

Zhang C. H. et al: "Preparation and Characterization of Hydrophilic Modification of Polypropylene Non-Woven Fabric by Dip-Coating PVA (Polyvinyl Alcohol)". Separation and Purification Technology, Elsevier Science, Amsterdam, NL, vol. 61, No. 3, Jul. 15, 2008, pp. 276-286, XP022689164. ISSN: 1383-5866 (retrieved on Nov. 9, 2007) p. 276, col. 2, paragraph 3; table 2.

Vinod M. P. et al: "Silicon Based Light Emitting Gels". Applied Physics Letters, AIP, American Institute of Physics, Melville, NY, US, vol. 68, No. 1, Jan. 1, 1996, pp. 81-83, XP000548797 ISSN: 0003-6951 p. 82, col. 1, paragraph 2.

R. Thiruvenkatachari, S. Vigneswaran & I. S. Moon: "A review on UV/TiO2 Photocatalytic Oxidation Process", Korean J. Chem Eng., vol. 25, No. 1, Jan. 2008 pp. 64-72, XP002555240 p. 65, col. 1, paragraph 2—col. 2, paragraph 4.

Yacobi B.G. et al: "Adhesive Bonding in Microelectronics and photonics", Journal of Applied Physics, American Institute of Physics. New York, US, vol. 91, No. 10, May 15, 2002 (2002-05-15), pp. 6227-6262, XP012054553.

\* cited by examiner

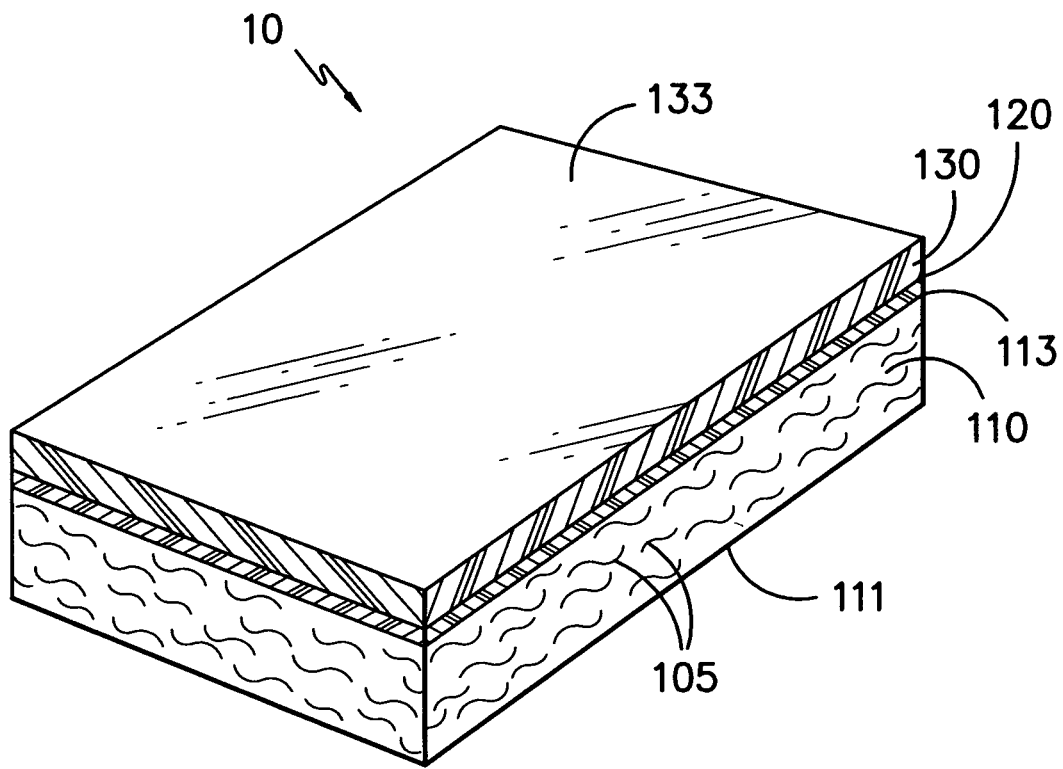
FIG. -1-

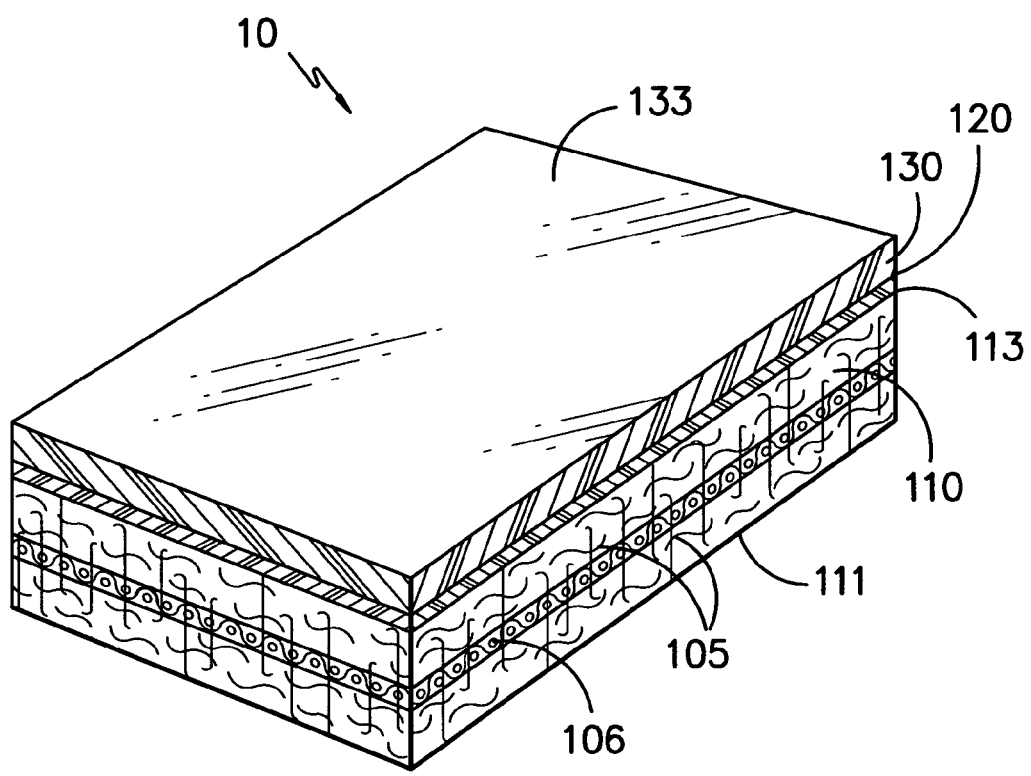
FIG. -2-

NON-WOVEN COVER FOR CONTAINING AND ABATING ODIFEROUS ORGANIC EMANATIONS

FIELD OF THE INVENTION

The present application is directed to covers for decaying organic materials. More particularly, the present application is directed towards a non-woven odiferous organic compound cover having additional polymeric layers and odor mitigating properties.

BACKGROUND

Recent advances in the use of composting at waste treatment facilities has enabled the world to deal with their waste in a much more environmentally beneficial and cost effective manner. Composting allows the breakdown of organic materials back to environmentally beneficial byproducts in a more time efficient and controlled manner. Additionally, composting can reduce the volume of material required to be land filled by up to 80%.

Covering the composting pile with a textile type substance has shown many advantages. The cover allows the pile to generate a more uniform level of heat, keeps unwanted vermin and scavengers from entering the pile, helps to maintain consolidation of the material, and allows for better moisture control of the compost pile. The use of plastic film has been used for many years and can in many states qualify the composting material for "in vessel" consideration. One issue with plastic covers, and even some textile covers, is the buildup of volatile organic compounds within the pile, as well as the inability of the composting material to properly degenerate in an aerobic environment.

Thus, there is a need for a cover which is capable of providing the positive aspects above, and also helps to control the emission of volatile substances. More particularly a cover which can control odorous fumes and pathogens developed during decomposition of the waste; and also provides appropriate gaseous exchange and water vapor transmission to provide an optimal aerobic environment. The optimal cover will provide operational reliability, product quality, minimum investment, and operating cost.

BRIEF SUMMARY OF THE INVENTION

The invention relates to an odiferous organic compounds cover having an inner surface and an outer surface. The cover contains a thermoplastic non-woven layer having a first side and a second side and comprising thermoplastic fibers. The first side of the non-woven layer forms the inner side of the cover, has a contact angle with water greater than about 70°, and is non-wicking. The cover contains a UV barrier layer on the second side of the non-woven layer, where the UV barrier layer contains a UV blocking polymer which blocks at least 50% of UV(C) energy. The UV barrier layer has a thickness of between one to three times the diameter of the thermoplastic fibers of the non-woven layer and the UV barrier layer comprises discontinuities forming microchannels through the layer thickness. The cover also contains an odor mitigation layer on the UV barrier layer on the side of the barrier layer opposite the non-woven layer. The odor mitigation layer comprises a UV translucent polymer which transmits at least about 60% of UV(C) energy and anatase titanium dioxide. The odor mitigation layer comprises discontinuities forming microchannels through the layer thickness forms the outer surface of the cover. A system for composting waste using the cover is also disclosed.

BRIEF DESCRIPTION OF THE DRAWINGS

FIG. 1 illustrates a cross-section of one embodiment of the invention.

FIG. 2 illustrates a cross-section of another embodiment of the invention.

DETAILED DESCRIPTION OF THE INVENTION

The invention is directed towards the containment of odiferous organic compounds that may create a human nuisance. The term "compost cover" is defined as a cover for decaying organic mater, the origin of which could be from composting or decaying materials, sewage treatment, cesspool, hog lagoons, manure dumps, portable toilets, trashcans, body bags, and the like.

Referring now to FIG. 1, there is shown one embodiment of the odiferous organic compounds cover 10 (also referred to herein in the specification as the compost cover) including in order a non-woven layer 110, a UV barrier layer 120, and an odor mitigation layer 130. The non-woven layer 110 forms the inner surface 111 of the compost cover 10 adjacent the compost or other waste to be contained. The odor mitigation layer 130 forms the outer surface 133 of the cover 10 facing the surrounding environment. The cover 10 performs in a manner to provide controlled release of VOCs from the compost pile to the environment; and adequate oxygen levels from the environment to the compost pile. In one embodiment, the total thickness of the compost cover 10 is between about 200 to 1000 micrometers, more preferably 280 to 400 micrometers.

The non-woven layer 110 comprises thermoplastic fibers in a non-woven construction. The non-woven layer 110 contains thermoplastic fibers. Preferably, these fibers are synthetic fibers of a hydrophobic nature such as polypropylene or polypropylene co-polymer fibers. The fibers in the non-woven layer may be either staple or continuous. The non-woven layer has a first side 111 forming the inner surface of the compost cover 10 and a second side 113 in which the additional layers are placed. The term non-woven refers to structures incorporating a mass of fiber elements that are entangled and/or heat fused so as to provide a coordinated structure with a degree of internal coherency. Non-woven fabrics or webs may be formed from many processes such as for example, meltspun processes, hydroentangeling processes, mechanically entangled processes and the like.

In one embodiment, the thermoplastic fibers 105 of the non-woven layer 110 are mechanically entangled, and then a portion of the thermoplastic fibers 105 are bonded to one another through calendaring the non-woven layer 110 on at least one side. Preferably, the non-woven layer 110 is calendared on the first side 111 (the side which forms the inner surface of the compost cover 10). Calendaring the side 111 of the non-woven layer 110 smoothes the surface of the layer increasing its strength, tear, and abrasion resistance and reduces the chance of the compost abrading or catching on the compost cover 10. In another embodiment, both sides of the non-woven layer 110 are calendared further enhancing the strength of the non-woven layer 110.

The inner surface 111 of the compost cover is hydrophobic with a contact angle greater than 70°, more preferably greater than 90°. The non-woven layer 110 is also non-wicking. Non-wicking is defined as having a water vapor transmission of less than 1000 g/m²/24 hours as measured by ASTM E-96 standard. In a more preferred embodiment, the compost cover 10 has a water vapor transmission of less than 500 g/m²/24 hours as measured by ASTM E-96 standard. This hydrophobic, non-wicking surface causes the water vapor from the compost to condense and form water droplets on the inner surface 111 of the compost cover 10 instead of diffusing through the cover. These water droplets form a film of water that actively contains the VOCs via dissolution. Through this mechanism, at least a portion of the odors emanating from the composting waste are blocked from the surrounding environment.

A UV barrier layer 120 is applied to the second side 113 of the non-woven layer 110. The UV barrier layer 120 contains a UV blocking polymer, where the UV blocking polymer blocks at least 50% of UV(C) energy. More preferably, the UV blocking polymer blocks at least about 70% of UV(C) energy. The UV barrier layer has a thickness of between one to three times the diameter of the thermoplastic fibers of the non-woven layer, more preferably about two times the diameter of these fibers. This allows some of the fibers from the non-woven layer 110 to poke through the UV barrier layer 120 creating discontinuities. These discontinuities form microchannels through the layer thickness and allow some water vapor and other gases such as carbon dioxide to diffuse through the compost cover 10. In one embodiment, the UV barrier layer 120 and the non-woven layer 110 together should have an air permeability of less than about 500 cfm/ft². Preferably, the UV blocking polymer comprises silicone. It has been found that silicone provides good UV blocking, creates a layer with microchannels at the proper thicknesses, and adds to the strength and durability of the compost cover 10.

An odor mitigation layer 130 is located on the UV barrier layer 120 (on the side opposite to the non-woven layer 110) forming the outer surface 133 of the compost cover 10. The odor mitigation layer contains a UV translucent polymer transmits at least about 60% of UV(C) energy, anatase titanium dioxide, and optionally activated carbon. In a preferred embodiment, the UV translucent polymer which transmits at least about 90% of UV(C) energy. In one embodiment, the UV translucent polymer is polyurethane. It has been found that polyurethane has good environmental stability and does not passivate the $TiO_2$.

When irradiated with light, titanium dioxide produces electrons with a powerful reductive action and holes with a powerful oxidative action, and decomposes any molecular species with which it comes into contact by a redox action. This action of titanium dioxide, namely, its photocatalytic action, can be used to break down volatile organic compounds. A major advantage of this process is that it can be repeated without depleting the effective agent. Additionally, because the reaction products are harmless carbon dioxide and so on, there are fewer restrictions on the reaction conditions, such as temperature, pH, gas atmosphere, and toxicity, than with such methods as biological treatment using microbes. Furthermore, even organic halogen compounds, organic phosphorus compounds, and other such compounds that are difficult to treat with methods such as biological treatment can be easily decomposed and removed.

In terms of performance as a photo catalyst, the crystal form of titanium dioxide is preferably anatase. Rutile, brookite, and amorphous forms are less desirable because the activity of the photo catalyst will be lower. A metal such as platinum, rhodium, ruthenium, palladium, silver, copper, or zinc may be supported on the surface of the titanium dioxide, which further raises the oxidative decomposition rate of chemical substances. Preferably the $TiO_2$ has a surface area of at least about 40 m²/gram. One type of anatase $TiO_2$ that is suitable for the application is Degussa P25.

In one embodiment, the odor mitigating layer 130 further comprises activated carbon. As used herein, "activated carbon" refers to highly porous carbon having a random or amorphous structure. Granules and pellets of activated carbon are well known, such as the products manufactured by Calgon Carbon, Inc. (Pittsburgh, Pa.), and can be used in the present invention. Activated carbon from any source can be used, such as that derived from bituminous coal or other forms of coal, or from pitch, coconut shells, corn husks, polyacrylonitrile (PAN) polymers, charred cellulosic fibers or materials, wood, and the like. Activated carbon particles can, for example, be formed directly by activation of coal or other materials, or by grinding carbonaceous material to a fine powder, agglomerating it with pitch or other adhesives, and then converting the agglomerate to activated carbon.

In one embodiment, the activated carbon is provided with functional groups to modify the surface properties of the product. For example, during the activation stage, the carbon can be exposed to hydrogen chloride to add chlorine groups, to oxygen or water vapor to add oxygen or hydroxyl groups, to ammonia to add amine groups, to hydrogen to add hydrogen, and so forth. Alternatively, a compound such as a non-gaseous molecule may be added to the carbon prior to activating it or prior to a post-treatment step, wherein the compound reacts at elevated temperature to add functional groups to the activated carbon.

Activated carbon in any form can also be impregnated with other materials to increase the adsorption of specific species. For example, activated carbon impregnated with citric acid can be used to increase the ability of activated carbon to adsorb ammonia. Impregnation with sodium hydroxide or other caustic compounds can be useful for removal of hydrogen sulfide. Impregnation with metals or metal ions such as copper sulfate and copper chloride is believed to be useful for removal of other sulfur compounds.

The odor mitigation layer 130, like the UV blocking layer 120, contains discontinuities, these discontinuities form microchannels through the layer thickness and allow water vapor and other gases such as carbon dioxide to diffuse through the compost cover 10. This allows for the release of gaseous buildup within the compost pile and maintenance of an aerobic condition of the compost pile. Preferably, the odor mitigation layer has a thickness of between about 2 and 12 mm. Additionally, the odor mitigation layer preferably contains about 0.05 to 4.0% wt of $TiO_2$ and about 0.1 to 8% wt activated carbon.

In one embodiment, the non-woven layer 110 further comprises a woven layer embedded within the non-woven layer as shown in FIG. 2. There is shown in FIG. 2 a compost cover 10 invention including in order a non-woven layer 110 containing non-woven fibers 105 and a woven layer 106, a UV barrier layer 120, and an odor mitigation layer 130. The non-woven layer 110 forms the inner surface 111 of the compost cover 10 adjacent the compost or other waste to be contained. The odor mitigation layer 130 forms the outer surface 133 of the compost cover 10 facing the surrounding environment.

The woven layer 106 in the non-woven layer 110 serves to enhance the tensile strength and durability to the compost cover 10. The woven layer 105 may be formed of any fibers and any materials suitable to the end use of the compost cover. For purposes of the present invention, fiber is defined as an elongated body, the length dimension of which is much greater than the dimensions of width and thickness. Accordingly, the term fiber as used herein includes a monofilament elongated body, a multifilament elongated body, ribbon, strip, and the like having regular or irregular cross sections. The term fibers includes a plurality of any one or combination of the above. By way of example only and not limitation, it is contemplated that the fibers in the woven layer 106 may be from natural or synthetic fibers such as polypropylene, polyester, glass (including fiberglass), nylon, and the like. Fibers such as glass and nylon are particularly beneficial in that they typically provide the greatest increase in tensile strength to the non-woven layer 110 at the lowest weight and cost.

One potentially preferred construction for the woven layer 106 in the non-woven layer 110 is a plain weave construction of ribbon elements of polypropylene. It is to be understood that the term "tape element" is meant to denote a relatively flat structure or tape having a width dimension substantially greater than a height dimension. Of course round yarn structures such as spun or monofilament yarns as well as other geometries may likewise be utilized if desired. In one contemplated woven construction, stabilized polypropylene ribbon fiber is woven at a density of about 24 ends per inch by about 22 picks per inch. The ribbon fiber forming the ends has a linear density of about 1000 denier. The ribbon fiber forming the picks has a linear density of about 600 denier.

The term "polypropylene" is intended to encompass any polymeric composition comprising propylene monomers, either alone or in mixture or copolymer with other randomly selected and oriented polyolefins, dienes, or other monomers (such as ethylene, butylene, and the like). Such a term also encompasses any different configuration and arrangement of the constituent monomers (such as syndiotactic, isotactic, and the like). Thus, the term as applied to fibers is intended to encompass actual long strands, tapes, threads, cut up segments and the like, of drawn polymer. The polypropylene may be of any standard melt flow (by testing); however, standard fiber grade polypropylene resins possess ranges of Melt Flow Indices between about 2 and 50.

In one embodiment, the polypropylene tape elements are stabilized. The term "stabilized polypropylene" refers to polypropylene to which one or more nucleating agents have been added. The terms "nucleating agent", and "nucleating agents" are intended to generally encompass, singularly or in combination, any additive to polypropylene that produces nucleation sites for polypropylene crystals from transition from its molten state to a solid, cooled structure. Hence, since the polypropylene composition (including nucleating agent additives) must be molten to eventually extrude the fiber itself, the nucleating agent provides such nucleation sites upon cooling of the polypropylene from its molten state. Such compounds provide the necessary nucleation sites prior to polypropylene recrystallization itself. Thus, any compound that exhibits such a beneficial effect and property is included within this definition. Such nucleating agents more specifically include dibenzylidene sorbitol types, including, without limitation, dibenzylidene sorbitol (DBS), monomethyldibenzylidene sorbitol, such as 1,3:2,4-bis(p-methylbenzylidene) sorbitol (p-MDBS), dimethyl dibenzylidene sorbitol, such as 1,3:2,4-bis(3,4-dimethylbenzylidene)sorbitol (3,4-DM-DBS); other compounds of this type include, again, without limitation, sodium benzoate, NA-11, and the like. Such a stabilized polypropylene is described in U.S. Patent Application Publication 2003/01341118 and U.S. Pat. Nos. 6,866, 912 and 6,998,081, each of which are hereby fully incorporated by reference. The nucleation of the polypropylene fibers can be used to enhance fiber tensile strength as well as improve resistance to UV degradation.

In a preferred embodiment, the non-woven fibers 105 of the non-woven layer 110 are entangled through the woven layer 106 by needlepunching. By way of example only and not limitation, according to one contemplated practice, the non-woven layer 110 containing a woven layer 106 is a fused multi-component structure of a woven layer 106 and a non-woven fibers 105 needle punched through the woven layer 105. When the optional process of calendaring is applied to one or both sides a portion of the non-woven fibers 105 and the woven fibers fuse to form an enhanced stable non-woven layer 110. More details about materials and constructions of the non-woven layer containing a woven layer may be found in U.S. Patent Publication 2003-0175475 and U.S. Pat. No. 6,866,912, both of which are herein incorporated by reference.

EXAMPLES

Various embodiments of the invention are shown by way of the Examples below, but the scope of the invention is not limited by the specific Examples provided herein.

Testing Methods

Air Flow Permeability

Air flow permeability was measured using were done using the ASTM D-737 test and the results are indicated using the units of cubic feet/minute/square foot of fabric (CFM/ft$^2$).

VOC Diffusion—Static

Odiferous organic compounds cover samples were used to seal a vial containing methyl salicylate VOC. This sealed vial was then placed into a second vial and left to equilibrate for 20 minutes. The air in the second vial (outside of the first vial) was then samples and analyzed to determine the amount of VOC diffusing through the compost cover examples.

VOC After Exposure to Sunlight

Narrow bottles with septum caps each containing different materials were spiked with the same concentration of propionaldehyde. These bottles were kept outside in the sun for 12 hours during a sunny day for UV exposure. The contents of these bottles were analyzed using manual headspace.

The control bottle had no additional odor mitigating materials in the bottle. In the rest of the bottles, equivalent amounts of materials typically used in the compost cover were used.

EXAMPLES

Example 1

A thermoplastic non-woven layer was formed from staple polypropylene fibers having an average length of about 3 inches and an average denier of about 6. The fibers were entangled using needle punching. The non-woven layer was calendared on both sides using a heat of about 170° C. (338° F.). The resultant non-woven layer had a thickness of 400 micrometers and a density of 5 oz/yd$^2$.

Example 2

The non-woven layer of Example 1 was coated with a UV barrier layer. The UV barrier layer was a silicone layer having a thickness of about 76 micrometers. The silicone used was Elastosil® LR 6293 available from the Wacker Silicone a division of Wacker-Chemie GmbH. The silicone layer had discontinuities forming microchannels through the layer thickness.

Example 3

The layers of Example 2 were coated with an odor mitigation layer, with the odor mitigation layer being coated on top of the silicone layer. The odor mitigation layer contained anatase TiO$_2$ and activated carbon in polyurethane. The polyurethane used was MILLITEX™ Resin MRX (a blocked isocyanate based cross-linking agent (with 35-45% solids) available from Milliken Chemical. The anatase TiO$_2$ had a surface area of about 40 m$^2$/g and was obtained from DeGussa® P25 from Evonik Degussa in Germany. The activated carbon had an average particle size of 20 micrometers and was obtained as the GX230 grade supplied by PICA USA Inc. The polyurethane layer had approximately 0.8% wt TiO$_2$ and approximately 1.5% wt activated carbon. The odor mitigation layer comprises discontinuities forming microchannels through the layer thickness. The polyurethane layer had approximately 1.2% wt TiO$_2$ and approximately 2.3% wt activated carbon.

Example 4

A thermoplastic non-woven layer was formed from staple polyester fibers having an average length of about 3 inches and an average denier of about 6. A polypropylene tape woven layer was laid onto the polypropylene fibers. The tape elements have a thickness of about 50 micrometers, a width of about 2 millimeters, and were woven in a plain weave. The fibers were entangled with each other and the woven tape layer by needle punching the fibers through the woven layer. The non-woven layer was calendared on one side. The resultant non-woven layer had a weight of about 5.5 oz/yd$^2$.

Example 5

The non-woven layer of Example 4 was coated with a UV barrier layer. The UV barrier layer was a silicone layer having a thickness of about 67 micrometers. The silicone used was Elastosil® LR 6293 available from the Wacker Silicone a division of Wacker-Chemie GmbH. The silicone layer had discontinuities forming microchannels through the layer thickness.

Example 6

The layers of Example 5 were coated with an odor mitigation layer, with the odor mitigation layer being coated on top of the silicone layer. The odor mitigation layer contained anatase TiO2 and activated carbon in polyurethane. The polyurethane used was MILLITEX™ Resin MRX (a blocked isocyanate based cross-linking agent (with 35-45% solids) available from Milliken Chemical. The anatase TiO$_2$ had a surface area of about 40 m$^2$/g and was obtained from DeGussa® P25 from Evonik Degussa in Germany. The activated carbon had an average particle size of 20 micrometers and was obtained as the GX230 grade supplied by PICA USA Inc. The polyurethane layer had approximately 1.2% wt TiO$_2$ and approximately 2.3% wt activated carbon. The odor mitigation layer comprises discontinuities forming microchannels through the layer thickness.

Results

The Examples were tested for performance comparing the compost cover of the invention to control samples and subcomponents of the compost cover.

TABLE 1

Air Permeability and VOC diffusion of examples

| | Air Flow Permeability (CFM/sqft) | VOC diffusion - Static |
|---|---|---|
| Ex. 1 | 98.4 | 248 |
| Ex. 2 | 2.77 | 151 |
| Ex. 3 | 10.08 | 73 |
| Ex. 4 | 6.96 | 264 |
| Ex. 5 | 7.50 | 128 |
| Ex. 6 | 6.17 | 122 |

As one can observe from Table 1, the static VOC significantly improves (lower numbers mean less VOC permeates through the sample) by coating the non-woven layers (examples 1 and 4) with silicone (examples 2 and 5) and additionally the polyurethane with TiO$_2$ and activated carbon).

TABLE 2

VOC mitigation of odor mitigating layer materials

| Samples | VOC content after exposure to Sunlight |
|---|---|
| Control (no added odor mitigating materials) | 1365 |
| TiO2 nanoparticle powder (no binder) | 0 |
| TiO2 nanoparticle powder in polyurethane | 675 |
| TiO2 nanoparticle powder and activated carbon in polyurethane | 0 |

Testing the components of the compost cover to mitigate odor in a UV setting as above proves that the anatase TiO$_2$ does reduce VOCs. When the TiO$_2$ in placed in a binder, in this case polyurethane, it is less effective. This is believed to occur because some of the surface of the TiO$_2$ is passivated by the binder system. Adding activated carbon to the mixture of TiO$_2$ and binder is very effective at reducing VOCs in the presence of UV light.

TABLE 3

Contact angle measurements on inner surface of examples

| | Contact Angle (degrees) | Std. Dev |
|---|---|---|
| Ex. 2 | 101.9 | 5.3 |
| Ex. 3 | 81.1 | 20.0 |
| Ex. 4 | Wets immediately (~0.0) | |
| Ex. 5 | 72.2 | 2.3 |
| Ex. 6 | 56.1 | 37.6 |

As one can see from the contact angle measurement data, water does not substantially wet out on the inner surface of the invention examples (3 and 6) trapping water droplets on the inner surface which in turn help control the odor of the composting material under the compost cover. It is believed that the addition of silicone to one outer side of the non-woven layer (comparing examples 4 and 5) causes the inner layer of the non-woven layer to become more hydrophobic.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An odoriferous organic compounds cover having an inner surface and an outer surface comprising:
    a thermoplastic non-woven layer having a first side and a second side and comprising thermoplastic fibers, wherein the first side of the non-woven layer forms the inner surface of the compost cover, and wherein the first side of the non-woven layer has a contact angle with water greater than about 70° and is non-wicking, non-wicking being defined as having a water vapor transmission of less than 1000 $g/m^2/24$ hours as measured by ASTM E-96 standard, and wherein the thermoplastic fibers have a diameter;
    a UV barrier layer on the second side of the non-woven layer comprising a UV blocking polymer, wherein the UV barrier layer has a layer thickness, wherein the UV blocking polymer blocks at least 50% of UV(C) energy, wherein the UV barrier layer has a thickness of between one to three times the diameter of the thermoplastic fibers of the non-woven layer, and wherein the UV barrier layer comprises discontinuities forming microchannels through the layer thickness; and,
    an odor mitigation layer on the UV barrier layer on the side of the barrier layer opposite the non-woven layer, wherein the odor mitigation layer has a layer thickness, wherein the odor mitigation layer comprises a UV translucent polymer, wherein the UV translucent polymer transmits at least about 60% of UV(C) energy and anatase titanium dioxide, wherein the odor mitigation layer comprises discontinuities forming microchannels through the layer thickness, and wherein the odor mitigation layer forms the outer surface of the compost cover.

2. The odiferous organic compounds cover of claim 1, wherein the UV blocking polymer blocks at least 70% of UV(C) energy.

3. The odiferous organic compounds cover of claim 1, wherein the UV translucent polymer transmits at least about 90% of UV(C) energy.

4. The odiferous organic compounds cover of claim 1, wherein the first side of the non-woven layer is calendered and at least a portion of the thermoplastic fibers are bonded to one another.

5. The odiferous organic compounds cover of claim 4, wherein the second side of the non-woven layer is calendered.

6. The odiferous organic compounds cover of claim 1, wherein the thermoplastic fibers comprise polypropylene fibers.

7. The odiferous organic compounds cover of claim 1, wherein the non-woven layer further comprises a woven layer embedded by the non-woven fibers.

8. The odiferous organic compounds cover of claim 1, wherein the first side of the non-woven layer has a contact angle with water greater than about 90°.

9. The odiferous organic compounds cover of claim 1, wherein the odor mitigation layer further comprises activated carbon.

10. The odiferous organic compounds cover of claim 1, wherein the titanium dioxide has a surface area of at least about 40 $m^2$/gram.

11. The odiferous organic compounds cover of claim 1, wherein the UV blocking polymer comprises silicone.

12. The odiferous organic compounds cover of claim 1, wherein the UV translucent polymer comprises polyurethane.

13. An odiferous organic compounds containment system comprising:
    a) decaying organic material;
    b) a odiferous organic compounds cover oriented such that at least a portion of the decaying organic material is covered by the odiferous organic compounds cover, wherein the odiferous organic compounds cover has an inner surface and an outer surface and comprises:
        i) a thermoplastic non-woven layer having a first side and a second side and comprising thermoplastic fibers, wherein the first side of the non-woven layer forms the inner surface of the cover, and wherein the first side of the non-woven layer has a contact angle with water greater than about 70° and is non-wicking, non-wicking being defined as having a water vapor transmission of less than 1000 $g/m^2/24$ hours as measured by ASTM E-96 standard, and wherein the thermoplastic fibers have a diameter;
        ii) a UV barrier layer on the second side of the non-woven layer comprising a UV blocking polymer, wherein the UV barrier layer has a layer thickness, wherein the UV blocking polymer blocks at least 50% of UV(C) energy, wherein the UV barrier layer has a thickness of between one to three times the diameter of the thermoplastic fibers of the non-woven layer, and wherein the UV barrier layer comprises discontinuities forming microchannels through the layer thickness; and,
        iii) an odor mitigation layer on the UV barrier layer on the side of the barrier layer opposite the non-woven layer, wherein the odor mitigation layer has a layer thickness, wherein the odor mitigation layer comprises a UV translucent polymer wherein the UV translucent polymer transmits at least about 60% of UV(C) energy and anatase titanium dioxide, wherein the odor mitigation layer comprises discontinuities forming microchannels through the layer thickness, and wherein the odor mitigation layer forms the outer surface of the cover.

14. The odiferous organic compounds containment system of claim 13, wherein the cover blocks, adsorbs, and breaks down at least a portion of the odors emanating from the composting organic and inorganic waste.

15. The odiferous organic compounds containment system of claim 13, wherein the first side of the non-woven layer is calendered and at least a portion of the thermoplastic fibers are bonded to one another.

16. The odiferous organic compounds containment system of claim 13, wherein the non-woven layer further comprises a woven layer embedded by the non-woven fibers.

17. The odiferous organic compounds containment system of claim 13, wherein the first side of the non-woven layer has a contact angle with water greater than about 90°.

18. The odiferous organic compounds containment system of claim 13, wherein the odor mitigation layer further comprises activated carbon.

19. The odiferous organic compounds containment system of claim 13, wherein the UV blocking polymer comprises silicone.

20. The odiferous organic compounds containment system of claim 13, wherein the UV translucent polymer comprises polyurethane.

* * * * *

UNITED STATES PATENT AND TRADEMARK OFFICE
CERTIFICATE OF CORRECTION

PATENT NO. : 8,137,957 B2
APPLICATION NO. : 12/288636
DATED : March 20, 2012
INVENTOR(S) : Wenstrup et al.

It is certified that error appears in the above-identified patent and that said Letters Patent is hereby corrected as shown below:

Title page 1, In (57) ABSTRACT, - after "UV barrier layer", delete the word "contains".

Signed and Sealed this
Nineteenth Day of June, 2012

David J. Kappos
*Director of the United States Patent and Trademark Office*